(12) United States Patent
Burpee (10) Patent No.: US 11,695,581 B2
(45) Date of Patent: Jul. 4, 2023

(54) VIDEO CONFERENCE CALENDAR INTEGRATION

(71) Applicant: Intermedia.net, Inc., Sunnyvale, CA (US)

(72) Inventor: Eli Burpee, Portland, OR (US)

(73) Assignee: Intermedia.net, Inc., Sunnyvale, CA (US)

( * ) Notice: Subject to any disclaimer, the term of this patent is extended or adjusted under 35 U.S.C. 154(b) by 0 days.

(21) Appl. No.: 17/744,295

(22) Filed: May 13, 2022

(65) Prior Publication Data

US 2022/0271964 A1    Aug. 25, 2022

Related U.S. Application Data (63) Continuation of application No. 17/183,708, filed on Feb. 24, 2021, now abandoned.

(60) Provisional application No. 63/110,313, filed on Nov. 5, 2020.

(51) Int. Cl.
| | |
|---|---|
| *H04L 12/18* | (2006.01) |
| *H04L 9/40* | (2022.01) |
| *G06Q 10/1093* | (2023.01) |
| *H04L 12/46* | (2006.01) |
| *H04L 67/55* | (2022.01) |

(52) U.S. Cl.
CPC ..... *H04L 12/1818* (2013.01); *G06Q 10/1093* (2013.01); *H04L 12/4641* (2013.01); *H04L 63/083* (2013.01); *H04L 67/55* (2022.05)

(58) Field of Classification Search
CPC . H04L 12/1818; H04L 67/55; H04L 12/4641; H04L 63/083; G06Q 10/1093

USPC .......................................................... 709/204
See application file for complete search history.

(56) References Cited

U.S. PATENT DOCUMENTS

| | | | |
|---|---|---|---|
| 9,432,334 | B2 | 8/2016 | Walters et al. |
| 10,122,769 | B1 * | 11/2018 | Tuculescu ............ H04L 65/1073 |
| 10,210,484 | B2 * | 2/2019 | Bostick ................. H04W 4/021 |
| 10,572,859 | B1 * | 2/2020 | Evans ............... H04M 3/42068 |
| 10,592,867 | B2 * | 3/2020 | Rosenberg ............ H04L 51/046 |
| 10,630,843 | B1 * | 4/2020 | Rosenberg .......... H04L 63/0428 |
| 10,958,457 | B1 * | 3/2021 | Davis .................. H04L 12/2803 |
| 11,010,677 | B2 * | 5/2021 | Terra ..................... G06Q 50/205 |
| 11,082,467 | B1 * | 8/2021 | Hartnett ............... H04N 21/437 |
| 11,089,095 | B1 * | 8/2021 | Henkens ............. H04L 67/1051 |
| 11,120,409 | B1 * | 9/2021 | Worth ................ G06Q 10/1095 |
| 11,386,433 | B2 * | 7/2022 | Ponnusamy ... G06Q 10/063112 |
| 11,494,741 | B1 * | 11/2022 | Schemers ............... H04L 51/08 |
| 2010/0318806 | A1 | 12/2010 | Hardt |

(Continued)

OTHER PUBLICATIONS

"U.S. Appl. No. 17/183,708, Non Final Office Action dated Feb. 17, 2022", 11 pgs.

(Continued)

*Primary Examiner* — Melvin H Pollack
(74) *Attorney, Agent, or Firm* — Schwegman, Lundberg & Woessner, P.A.

(57) ABSTRACT

In an example embodiment, a tool to provide calendar integration with video conferencing technology to allow for the rendering of a specialized graphical user interface during a video conference that displays not only an identification of which users are currently attending or otherwise connected to the video conference but also an identification of users that have been invited to the video conference but not yet attended.

20 Claims, 8 Drawing Sheets

(56) References Cited

U.S. PATENT DOCUMENTS

| | | | |
|---|---|---|---|
| 2011/0277026 A1 | 11/2011 | Agarwal et al. | |
| 2012/0173526 A1* | 7/2012 | Abrams | G06Q 50/01 |
| | | | 707/E17.044 |
| 2014/0123231 A1 | 5/2014 | Low et al. | |
| 2016/0156592 A1 | 6/2016 | Walters et al. | |
| 2018/0089634 A1* | 3/2018 | Cannons | H04L 12/1818 |
| 2018/0103073 A1* | 4/2018 | Rosenberg | H04L 61/4555 |
| 2018/0184047 A1* | 6/2018 | Simonsen | H04N 7/152 |
| 2018/0241878 A1* | 8/2018 | Jack | H04M 3/42382 |
| 2019/0166115 A1 | 5/2019 | Manza et al. | |
| 2019/0189117 A1* | 6/2019 | Kumar | G06F 16/3329 |
| 2020/0274726 A1* | 8/2020 | Setteboun | G06F 3/04817 |
| 2021/0073742 A1* | 3/2021 | Janakiraman | G06Q 10/1095 |
| 2021/0105147 A1* | 4/2021 | Waugh | H04L 67/535 |
| 2021/0105332 A1* | 4/2021 | Bellet | H04L 67/54 |
| 2021/0150487 A1* | 5/2021 | Ghosh | G06Q 10/107 |
| 2021/0184876 A1* | 6/2021 | Kinsey | H04L 12/1818 |
| 2021/0211317 A1* | 7/2021 | Khan | H04N 7/155 |
| 2021/0233036 A1* | 7/2021 | Zarakas | G06F 9/542 |
| 2021/0233037 A1* | 7/2021 | Øhrn | G06Q 10/1095 |
| 2021/0264377 A1* | 8/2021 | Ebner | G06Q 10/1093 |
| 2021/0297461 A1* | 9/2021 | Athwal | G06Q 20/22 |
| 2021/0407520 A1* | 12/2021 | Neckermann | H04L 12/1831 |
| 2022/0060584 A1* | 2/2022 | Bhosle | H04M 3/565 |
| 2022/0070504 A1* | 3/2022 | Hartnett | H04L 12/1827 |
| 2022/0093088 A1* | 3/2022 | Rangarajan Sridhar | |
| | | | G06F 16/338 |
| 2022/0107852 A1* | 4/2022 | Kulkarni | G06F 9/542 |
| 2022/0141044 A1 | 5/2022 | Burpee | |
| 2023/0036178 A1* | 2/2023 | Geddes | G06N 20/00 |

OTHER PUBLICATIONS

Spreng, Thomas, "Authentication and authorization for mobile internet users", (2006), 88 pgs.

* cited by examiner

← → C  🔒 MEETING.ANY.COM/770-953-680  ⊟ ⊛ ✕
▦ APPS  ☐ RASPBERRY  ☐ CHARGING STATIONS ⓒ 5 BEST CITY AR... ☆ BOOKMARKS

DURATION: 30MIN  26MIN REMAINING

ATTENDEES  CHAT  NOTES  ⌄

(EB) ELI  🔇
(DL) DOUG  ％ ╱ 404
(☺) JULIUS INVITED
(☺) SEAN INVITED

🔇 MUTE ALL

DESIGN DISCUSSION /
HOSTED BY ELIBURPEE

MEETING INFO  ☐ ☑ ⌄

VIDEO CONFERENCE CALENDAR INTEGRATION

CROSS-REFERENCE TO RELATED APPLICATIONS

This application is a continuation of U.S. patent application Ser. No. 17/183,708, filed Feb. 24, 2021, which application claims the benefit of priority to U.S. Provisional Patent application entitled "VIDEO CONFERENCE CALENDAR INTEGRATION," Ser. No. 63/110,313, filed Nov. 5, 2020, both of which are hereby incorporated by reference herein in their entireties.

TECHNICAL FIELD

This application relates generally to computer networks. More specifically, this application relates to calendar integration for video conferences.

BACKGROUND

Video conferences have ballooned in popularity recently, boosted by a significant increase in the number of users who work from home or who use video conference technologies traditionally utilized for business calls for personal use. One issue that often comes up during such video conferences is that the attendees often do not know if they should be waiting on additional people to join before beginning the conference. Commonly, one person (whether a potential attendee or not) will have set up the video conference and invited a number of people to join the video conference, typically by sending an email to a group of users or similarly sending a calendar invite to a group of users. The attendees may, therefore, not be aware of whether everyone who currently is attending the video conference is indeed everyone who was invited. It is quite common, therefore, for time to be wasted during the video conference with people asking "do we have everyone here?" and "can we get started or are we waiting on anyone?" Indeed, in some cases, nobody who is currently attending the video conference actually knows whether there is anyone missing, and the group must either wait indefinitely for someone to arrive that was never invited, or must choose to begin the meeting under the threat of an important user missing the beginning of the meeting.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a tool to provide calendar integration with video conferencing technology to allow for the rendering of a specialized graphical user interface during a video conference that displays not only an identification of which users are currently attending or otherwise connected to the video conference but also an identification of users that have been invited to the video conference but not yet attended.

Modern video conference technology allows for users to establish video conferences to be started at particular dates and times. The user who establishes the video conference in that way is typically referred to as a "host." In some systems, a video conference cannot begin unless the host is present (i.e., connected to the video conference), although some systems permit video conferences to begin and even to run in their entirely without the host being present. Typically the host can invite multiple attendees by sending invitations. These invitations can take many forms. Modern e-mail programs combine traditional email functionality with calendar management, and allow for specialized e-mail communications called "calendar invites" to be sent. Calendar invites, when received, allow the recipient to "accept" or "reject" the meeting. If the calendar invite is accepted, the corresponding email system automatically populates a calendar entry for the appropriate date and time in the recipient's calendar and includes the video conference log-in information in the body of the calendar entry. As such, video conferences are commonly set up using such calendar invites, although some users prefer to use more traditional emails and include the video conference details in the body of the emails themselves.

It should be noted that while video conferences in particular are discussed in the present disclosure, many of the same techniques can be applied to audio-only conferences as well. Indeed, modernly video conference systems support audio-only conferences (or conferences where there is a mix of video-based users and audio-only-based users, such as where some users are in front of a computer equipped with a webcam while others are using devices without cameras, choose not to activate their cameras for purposes of the conference, or are using traditional telephones to call in). As such, nothing in this document should be interpreted as limiting the scope of the claims to video conferences, unless expressly recited.

In an example embodiment, a video conferencing system is integrated with a calendar system, allowing specialized communication between the calendar system and the video conferencing system. In some example embodiments, this integration is accomplished via a plug-in provided by the video conferencing system that is added to the calendar system.

Figure 1:
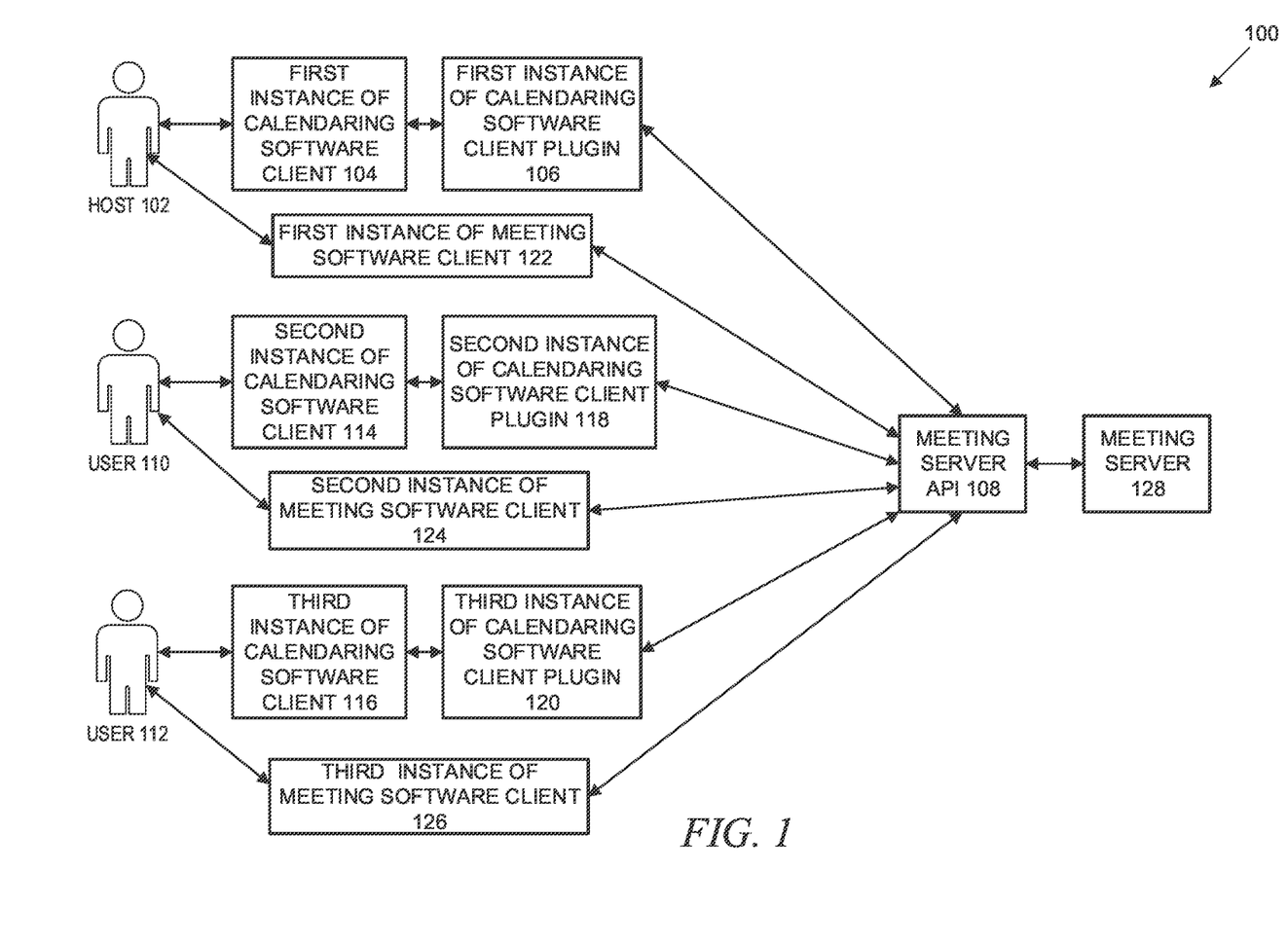
FIG. 1 is a block diagram illustrating a video conferencing system in accordance with an example embodiment.

FIG. 1 is a block diagram illustrating a video conferencing system 100 in accordance with an example embodiment. A host 102 uses a first instance of a calendaring software client 104 to schedule a video conference and cause invitations to be sent out to potential attendees). The host 102 is a user who performs these tasks, and the host may or may not be a potential attendee of the video conference as well. The host 102 provides a list of potential attendees (to be invited) as well as a meeting date and time. The first instance of the calendaring software client 104 communicates with a first instance of a calendaring software client plugin 106 to create a meeting for the video conference. It should be noted that one could also consider the first instance of the calendaring software client plugin 106 to be part of the first instance of the calendaring software client 104, and thus the communications described as occurring between these two components may actually be performed between two modules or application portions of the same piece of software, depending upon how one implements a plugin.

The first instance of the calendaring software client plugin 106 authorizes the host 102 with a meeting server Application Program Interface (API) 108. In some example embodiments, the host 102 is already authenticated prior to creating the meeting, and thus a session cookie or authorization token may be passed from the first instance of the calendaring software client 104 to the meeting server API 108 via the first instance of the calendaring software client plugin 106 each time a request is made.

Once the host 102 is confirmed to be authorized, the first instance of the calendaring software client plugin 106 may designate the meeting [what does this mean?]. This may include sending invites to each of the potential invitees and/or saving the meeting details (including date/time/invitees) for later use.

A response may then be sent to the host 102 informing the host 102 that the meeting has been scheduled and optionally including a link to the meeting that the host 102 may share with other users.

Various users, such as users 110 and 112 may then receive invites to the meeting via their own instances 114, 116 of the calendaring software client and their own instances 118, 120 of the calendaring software client plugin. Some users may accept the meeting invite, while other users decline the meeting invite, and yet other users may simply not respond. In an example embodiment, when a user, such as user 110, accepts the meeting invite, they do so by interacting with their instance (114) of the calendaring software client, which communicates this acceptance to the meeting server API 108 via the corresponding instance 118 of the calendaring software client plugin. The meeting details, and more specifically the list of attendees in the meeting details, may be updated to reflect this acceptance. It should be noted that for nomenclature purposes, a user who has been invited to a meeting and accepted the meeting request/invite will be termed an "attendee," regardless of whether the user actually shows up for the meeting (or, as will be seen, shows up late).

At the meeting time, a meeting server 128 may retrieve the meeting details from the meeting server API 108 and users (including potentially host 102) may join the meeting via their own instances of a meeting software client 122, 124, 126. The instances of the meeting software client 122, 124, 126 may each communicate directly with a meeting server 128, which coordinates and conducts the actual video conference. In some instances, the instances 104, 114, 116 of the calendaring software client may contain, in a calendar entry corresponding to the meeting, a link that when selected launches the corresponding instance of the meeting software client 122, 124, 126 to automatically join the meeting. The meeting server 128 thus has at its disposal the list of attendees and identifications of the actual users who have joined the meeting. It then acts to instruct the various instances of the meeting software clients 122, 124, 126 to graphically display not only the users who have actually joined the meeting but also the attendees who have not yet joined. The specifics of how this information is displayed graphically will be described in more detail below.

In some example embodiments, after a preset period of time from the meeting start, the meeting server 128 may act to instruct the various instances of the meeting software clients 122, 124, 126 to stop displaying the attendees who have not yet joined. This is because in many circumstances a user who does not join the meeting within that preset period is unlikely to join at all, and thus it is presumed that the substantive discussion in the video conference can commence at that point even if attendees have not arrived. For example, the preset period of time may be 10 minutes, and thus the graphical display of the users who have accepted the meeting invite but not yet joined the meeting is only rendered until 10 minutes after the meeting start time. It should be noted that this preset period of time can be dynamically configured, and may even vary from meeting to meeting based on various personalized factors. For example, each company, or even each department or group within a company, can have a different preset period of time, based on their own company/group cultures regarding how long it takes for all or substantially all attendees to join a meeting.

In an example embodiment, the preset period of time is learned via a machine learning algorithm, which trains a machine learned model to output an optimal preset period of time based on training data. For example, training data may include activity information collected over hundreds or thousands of meetings for a particular group of users, and the machine learned model may be trained to identify patterns in user behavior that indicate the likelihood of users in the group joining a meeting late (and by how much). In some example embodiments the training data may be transformed prior to it being fed into a machine learning algorithm for training, so that the data is organized in a similar manner from meeting to meeting in the training set. For example, the data may be reformatted so that, for each meeting in the training set, a first column of data reflects a user identification, a second column of data reflects a number of seconds that the corresponding user was late for the meeting, and a third column of data reflects a group identification for the corresponding user. A neural network or logistic regression process may be utilized for the machine learning aspect, and the machine learned model may, at a later time, be retrained based on subsequent meeting data.

Figure 2:
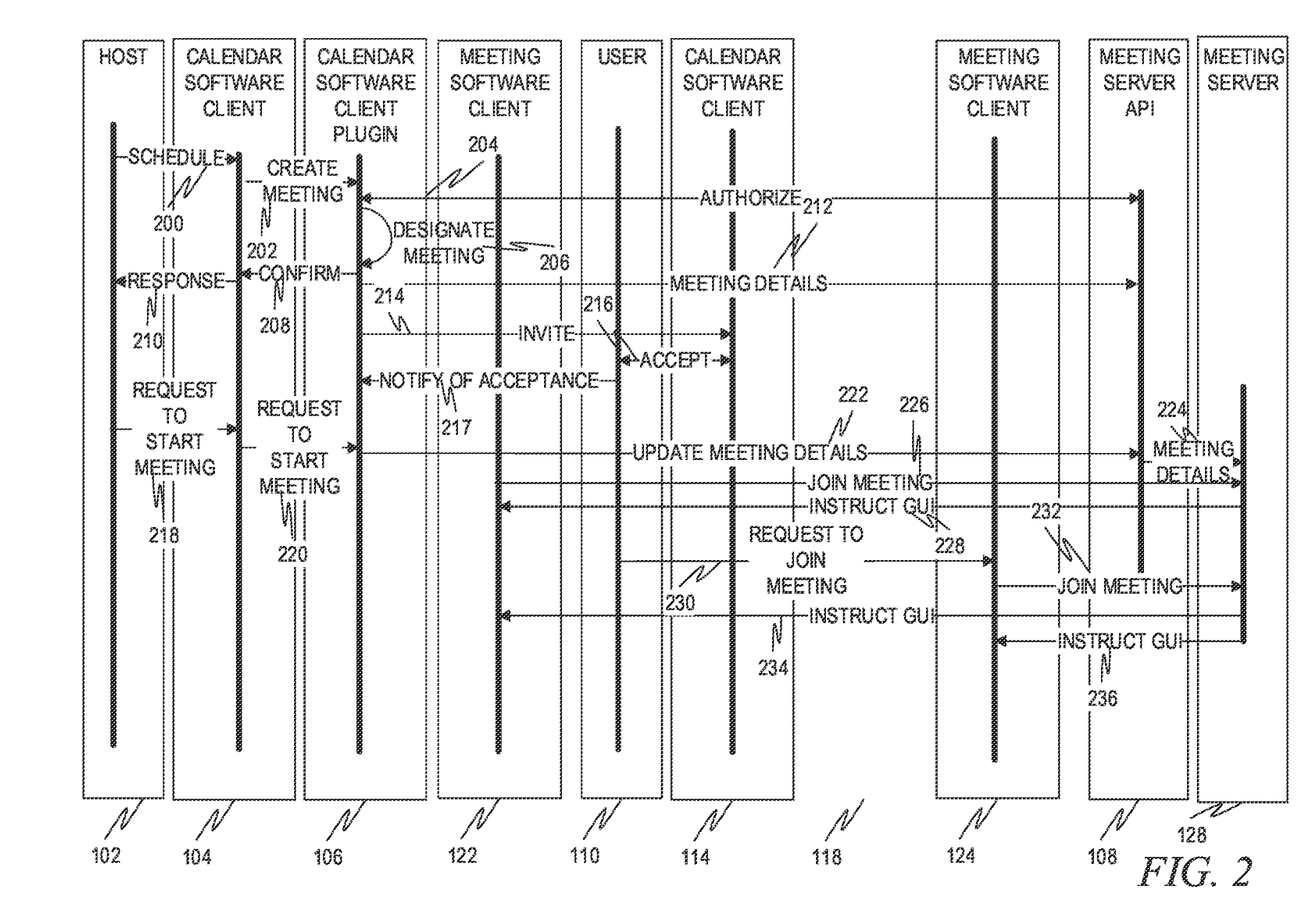
FIG. 2 is a sequence diagram illustrating a method for conducting a video conference, in accordance with an example embodiment.

FIG. 2 is a sequence diagram illustrating a method for conducting a video conference, in accordance with an example embodiment. Included in the sequence diagram are host 102, first instance of the calendaring software client 104, first instance of the calendaring software client plugin 106, first instance of the meeting software client 122, user 110, second instance of the calendaring software client 114, second instance of the meeting software client 124, meeting server API 108 meeting server 128.

At operation 200, host 102 interacts with the first instance of a calendaring software client 104 to schedule a video conference and cause invitations to be sent out to potential attendees). At operation 202, the first instance of the calendaring software client 104 communicates with the first instance of a calendaring software client plugin 106 to create a meeting for the video conference.

At operation 204, the first instance of the calendaring software client plugin 106 authorizes the host 102 with a meeting server Application Program Interface (API) 108.

Once the host 102 is confirmed to be authorized, at operation 206, the first instance of the calendaring software client plugin 106 may designate the meeting.

At operation 208, a confirmation may then be sent to the calendaring software client 204, which then sends a response to the host 102 at operation 210 informing the host 102 that the meeting has been scheduled and optionally including a link to the meeting that the host 102 may share with other users. At operation 212, the calendaring software client plugin 206 sends meeting details to the meeting server API 108.

Various users, such as user 110, may then at operation 214 receive invites to the meeting via their own instance 114 of the calendaring software client. Some users may accept the meeting invite, such as at operation 216, while other users decline the meeting invite, and yet other users may simply not respond. In an example embodiment, when a user, such as user 110, accepts the meeting invite, they do so by interacting with their instance (114) of the calendaring software client, which then at operation 217 notifies the first instance of the calendar software client plugin 106 about the acceptance. The meeting details, and more specifically the list of attendees in the meeting details, may be updated to reflect this acceptance.

At the meeting time, at operation 218, the host may request the calendar software client 104 to start the meeting. At operation 220, the calendar software client 204 then makes this request to the calendar software client plugin 106. At operation 222, the calendar software client plugin 206 then sends the updated meeting details to the meeting server API 108.

At operation 224, the meeting server API 108 sends the meeting details to the meeting server 228, which then which coordinates and conducts the actual video conference. The meeting server 128 thus has at its disposal the list of attendees and identifications of the actual users who have joined the meeting. As users join, the meeting server 128 updates the respective GUIs with updated status information.

At operation 226, the host joins the meeting via the first instance of the meeting software client 122, and at operation 228 the meeting server 128 instructs the GUI what to display (specifically, listing all attendees and indicating which have already joined). When user 110 requests to join the meeting at operation 230, the second meeting client 124 asks to join the meeting at operation 232. The meeting server 128 then instructs the GUIs on both the first instance of the meeting software client 122 and the second instance of the meeting software client 124 to update the respective displays, at operations 234 and 236, respectively, based on the recent join. Specifically, it instructs the GUIS to graphically display not only the users who have actually joined the meeting but also the attendees who have not yet joined.

Figure 3:
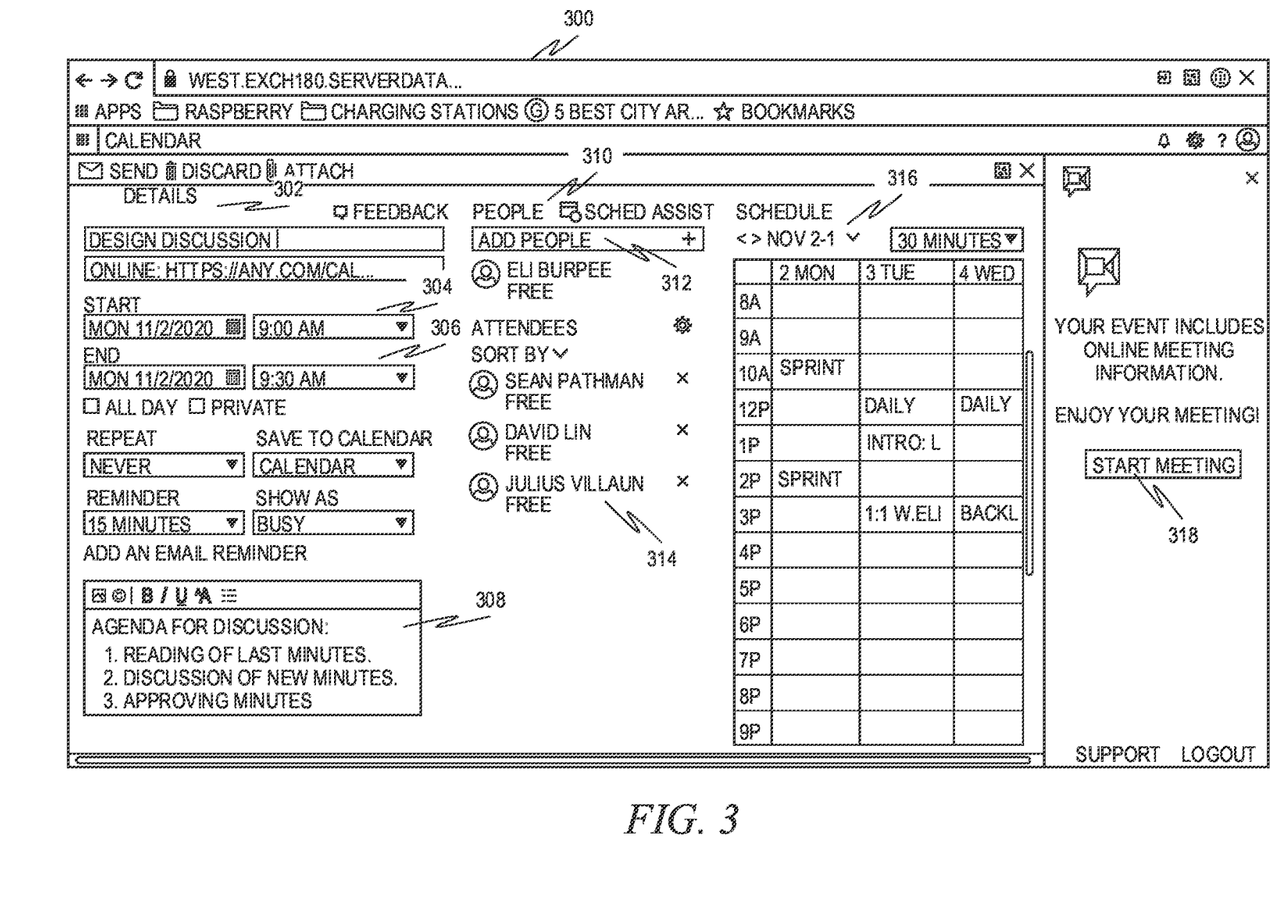
FIG. 3 is a screen capture illustrating a graphical user interface of an instance of a calendaring software client plugin (integrated with the calendaring software client), in accordance with an example embodiment.

FIG. 3 is a screen capture illustrating a graphical user interface 300 of an instance of a calendaring software client plugin (integrated with the calendaring software client), in accordance with an example embodiment. The graphical user interface 300 includes a portion 302 where a host can enter meeting details, including starting 304 and ending 306 date/times, as well as a text-based agenda 308 for the meeting. Another portion 310 allows the host to enter invitees 312, and a list of the current invitees 314 may be displayed for reference. The host's calendar 316 may also be displayed, as received from the calendaring software client. Finally, a link 318 may be provided allowing the host to start the meeting, which if selected will launch the host's instance of the meeting software client.

Figure 4:
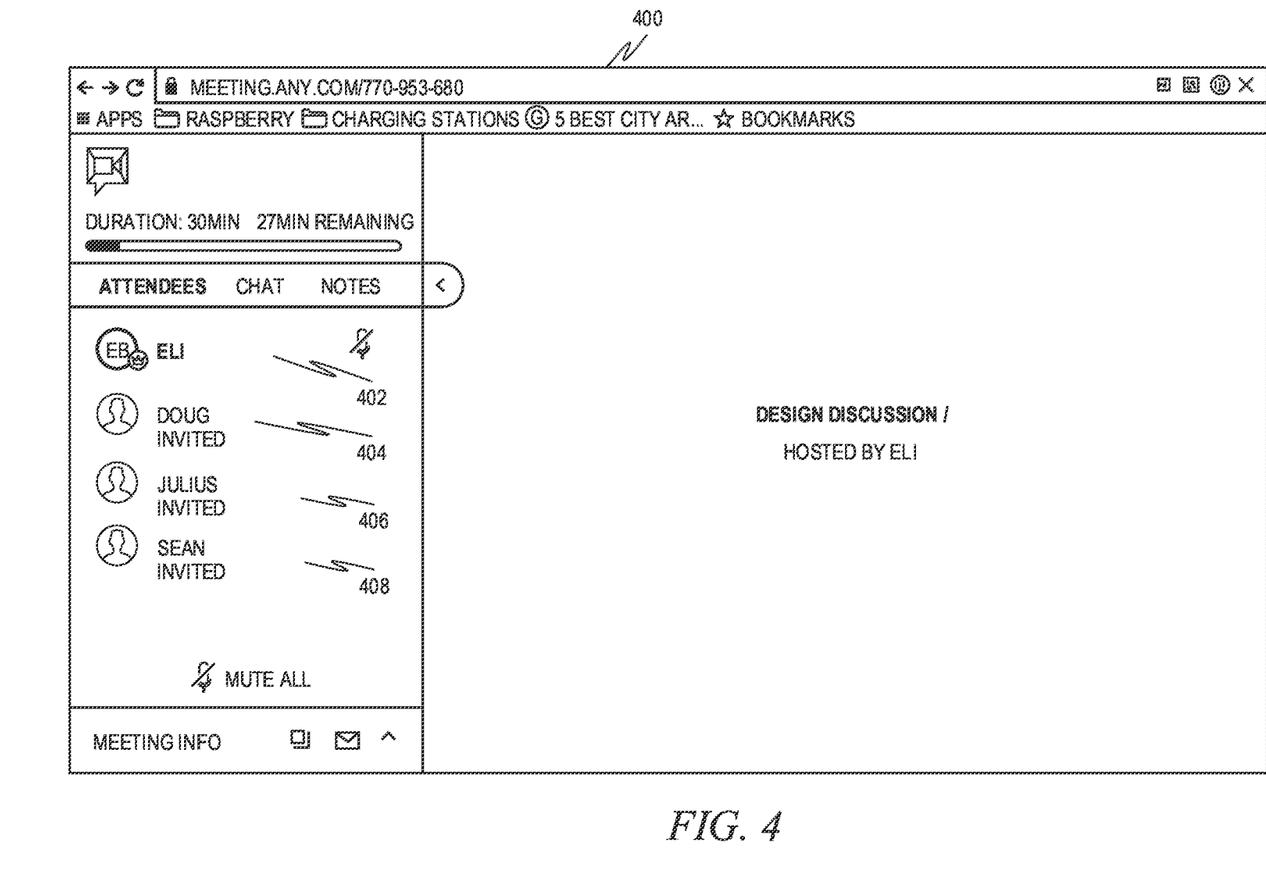
FIG. 4 is a screen capture illustrating a graphical user interface of an instance of the meeting software client, as displayed at a first time, in accordance with an example embodiment.

FIG. 4 is a screen capture illustrating a graphical user interface 400 of an instance of the meeting software client, as displayed at a first time, in accordance with an example embodiment. Here, the graphical user interface 400 graphically displays that the host 402 has joined the meeting, but other users 404, 406, 408 who have been invited to (and accepted the invitation for) the meeting but have not yet joined are also displayed. In an example embodiment, these other users 404, 406, 408 that have not joined are rendered using a lighter or dimmer font color/contrast to distinguish them from the user(s) (here host 402) that has/have joined. A textual indication that these other users 404, 406, 408 have been invited may also be displayed.

Figure 5:
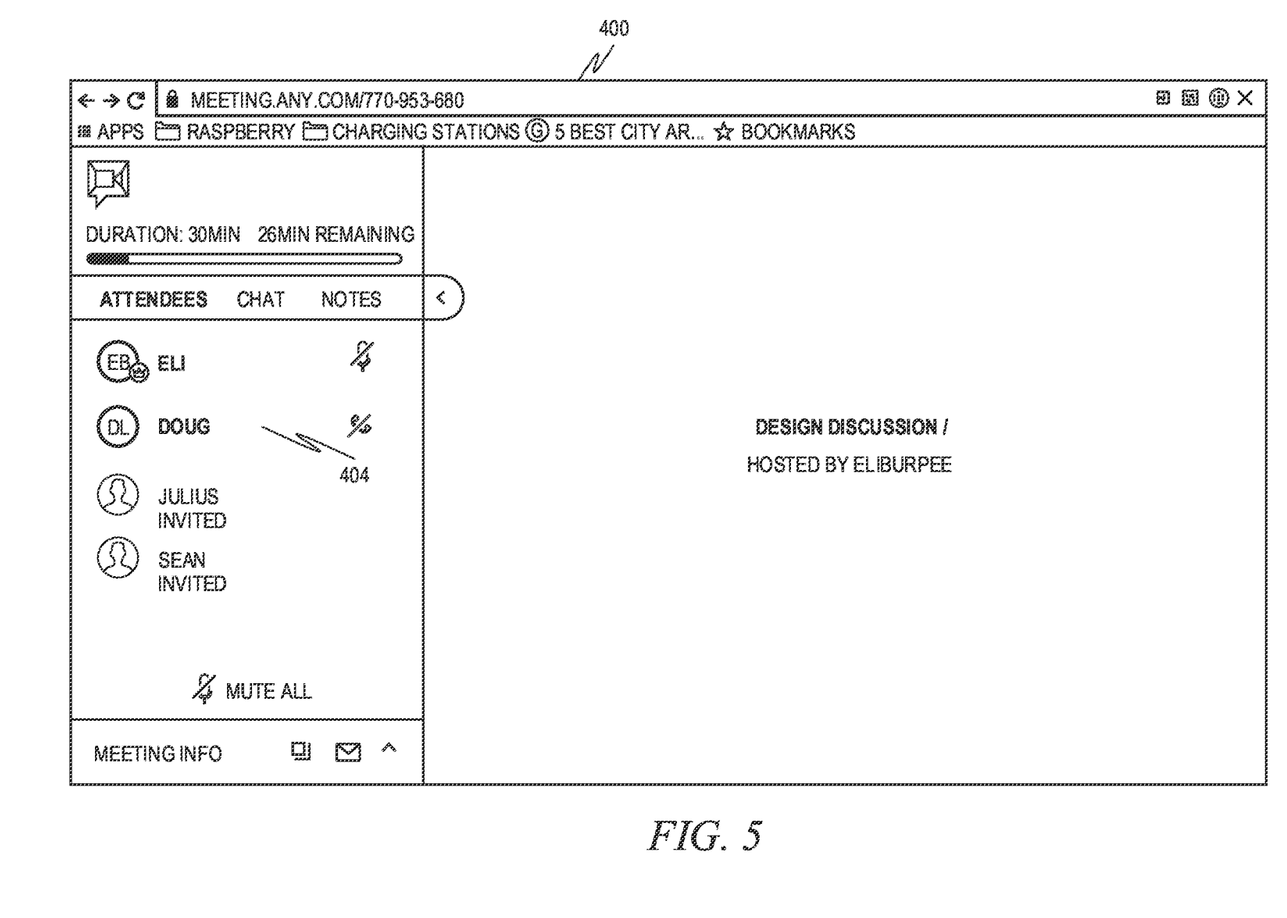
FIG. 5 is a screen capture illustrating the graphical user interface of an instance of the meeting software client, as displayed at a second time, in accordance with an example embodiment.

FIG. 5 is a screen capture illustrating the graphical user interface 400 of an instance of the meeting software client, as displayed at a second time, in accordance with an example embodiment. Here, the graphical user interface 400 graphically displays that the user 404 has now joined the meeting, and thus is no longer rendered using the lighter or dimmer font color/contrast and the "invited" designation has been removed.

Notably, in both FIG. 4 and FIG. 5, an indication 410 of meeting duration and time remaining may be displayed graphically as well, here depicted as bar that progresses towards the right as time passes. In some example embodiments where attendees who have not joined yet are removed from the graphical user interface 400 after a preset period of time, this indication 410 may further include an indication of how much time is left before that preset period of time expires. This may be displayed textually (e.g., "2 minutes left), via a separate bar graphically, or by color-coding the existing bar in a way that indicates how much time is left before the preset period of time expires.

Figure 6:
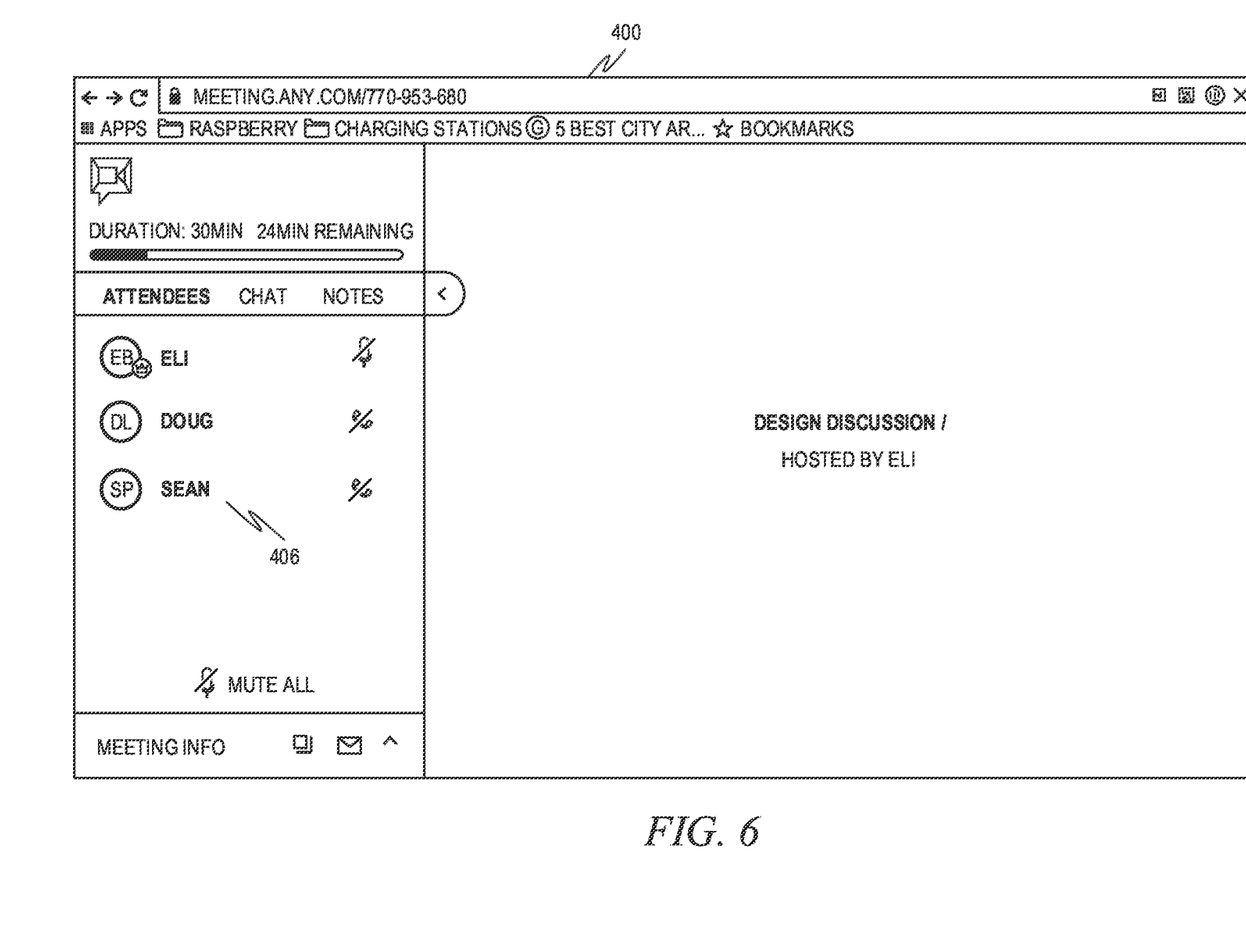
FIG. 6 is a screen capture illustrating the graphical user interface of an instance of the meeting software client, as displayed at a third time.

FIG. 6 is a screen capture illustrating the graphical user interface 400 of an instance of the meeting software client, as displayed at a third time. Here, user 406 has joined the meeting prior to the expiration of the preset period of time but user 408 has not, resulting in user 408 being removed from the graphical user interface 400.

Figure 7:
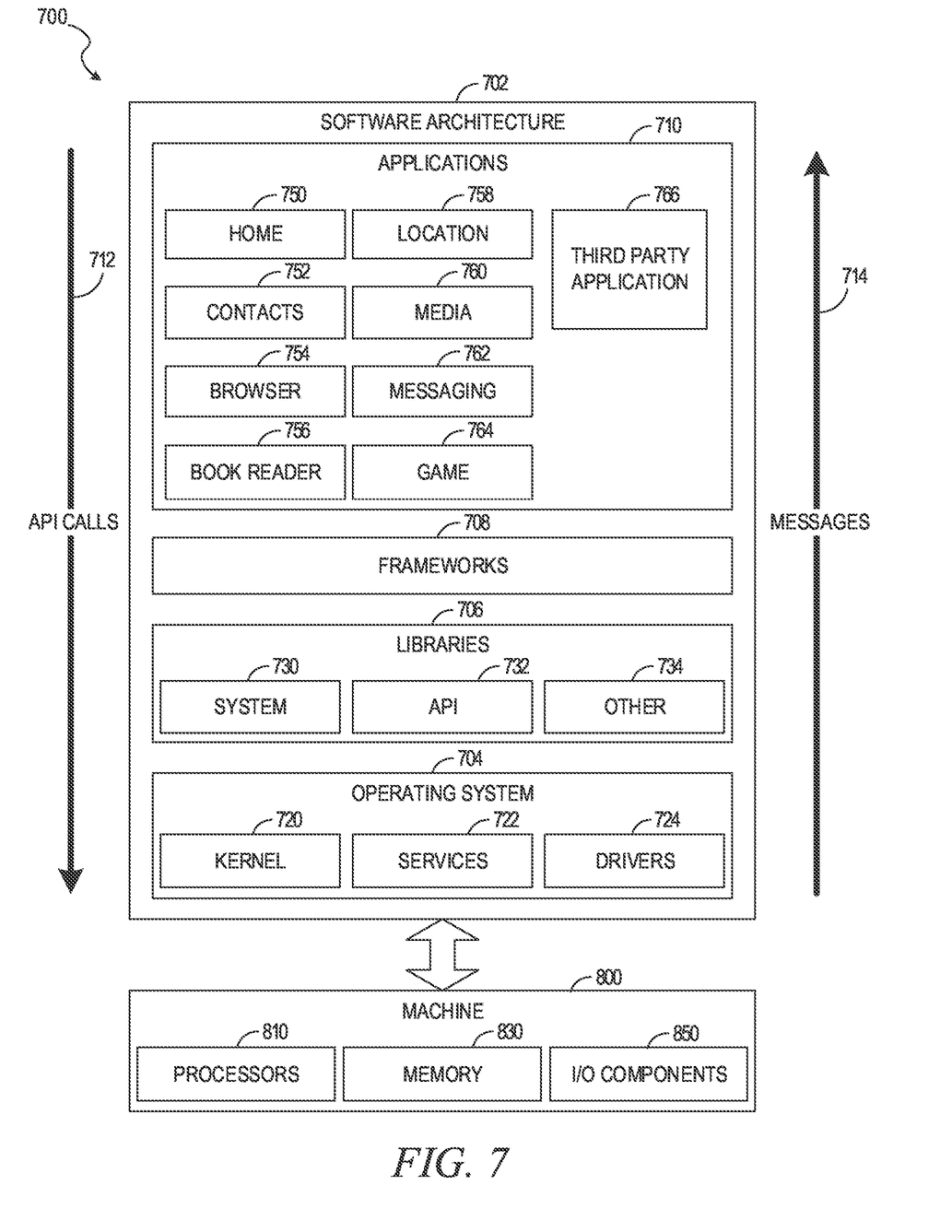
FIG. 7 is a block diagram illustrating a mobile device, according to an example embodiment.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various GUI functions, high-level resource management, high-level location services, and so forth. The frameworks 708 can provide a broad spectrum of other APIs that can be utilized by the applications 710, some of which may be specific to a particular operating system or platform.

In an example embodiments, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
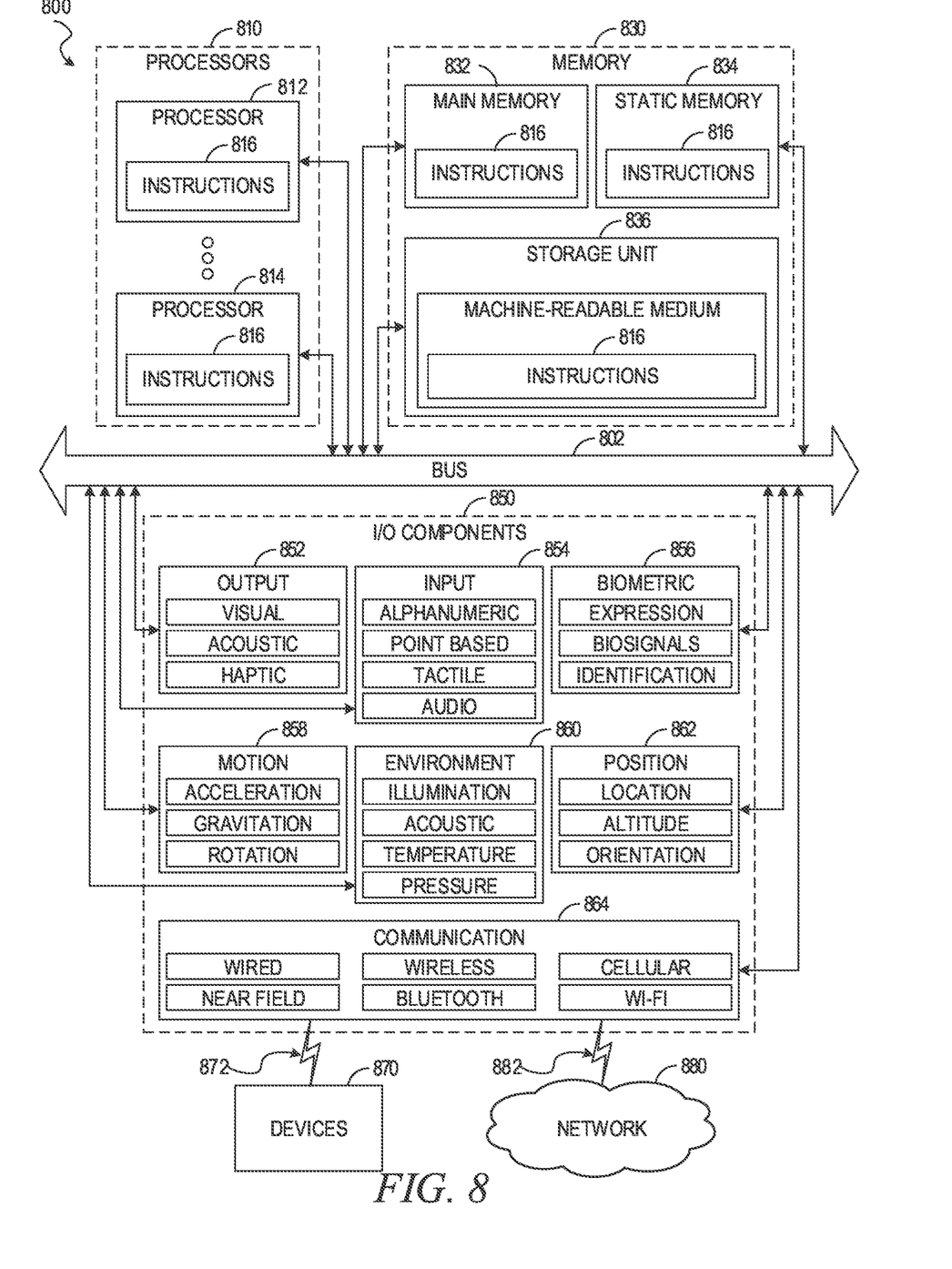
FIG. 8 is a block diagram of machine in the example form of a computer system within which instructions, for causing the machine to perform any one or more of the methodologies discussed herein, can be executed.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 200 of FIG. 2. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836, all accessible to the processors 810 such as via the bus 802. The main memory 830, the static memory 834, and storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or storage unit 836 may store one or more sets of instructions and data structures (e.g., software) embodying or utilized by any one or more of the methodologies or functions described herein. These instructions (e.g., the instructions 816), when executed by processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method of providing video conference calendar integration, comprising:

receiving, at a meeting server, via a meeting server application program interface (API), meeting details from a calendar software client plugin, the meeting details regarding a meeting scheduled by a host using a calendar software client associated with the calendar software client plugin, the meeting details including a list of invitees and a starting time for the meeting;

at a time matching the starting time for the meeting, initiating a video conference for the one or more actual attendees, the one or more actual attendees being potential attendee who have initiated a request to join the meeting, the initiating the video conference including causing rendering of a first user interface screen on a client device of each of the one or more actual attendees, the first user interface screen comprising a first portion displaying a list of all potential attendees, including one or more potential attendees who have not initiated a request to join the meeting, and a second portion displaying content of the meeting; and after a predetermined period of time, altering the first portion so that only actual attendees, including any potential attendees who did not initiate a request to join the meeting by the starting time of the meeting but who have since initiated a request to join the meeting, are displayed.

2. The method of claim 1, wherein the predetermined period is output by a machine learned model trained by a machine learning algorithm.

3. The method of claim 2, wherein the machine learned model is trained by inputting training data including activity information from past meetings, the activity information indicating which users initiated a request to start a past meeting after a starting time of the past meeting, and how late the users initiated the request to start a past meeting, the machine learning algorithm identifying patterns in user behavior that indicate a likelihood of users in group joining a past meeting late, and by how much.

4. The method of claim 3, wherein the machine learning algorithm is a neural network.

5. The method of claim 3, wherein the machine learning algorithm is a logistic regression process.

6. The method of claim 3, further comprising retraining the machine learned model using new training data.

7. The method of claim 3, wherein the training data is transformed prior to the training.

8. A system comprising:

at least one hardware processor; and a computer-readable medium storing instructions that, when executed by the at least one hardware processor, cause the at least one hardware processor to perform operations comprising:

receiving, at a meeting server, via a meeting server application program interface (API), meeting details from a calendar software client plugin, the meeting details regarding a meeting scheduled by a host using a calendar software client associated with the calendar software client plugin, the meeting details including a list of invitees and a starting time for the meeting;

at a time matching the starting time for the meeting, initiating a video conference for the one or more actual attendees, the one or more actual attendees being potential attendee who have initiated a request to join the meeting, the initiating the video conference including causing rendering of a first user interface screen on a client device of each of the one or more actual attendees, the first user interface screen comprising a first portion displaying a list of all potential attendees, including one or more potential attendees who have not initiated a request to join the meeting, and a second portion displaying content of the meeting; and after a predetermined period of time, altering the first portion so that only actual attendees, including any potential attendees who did not initiate a request to join the meeting by the starting time of the meeting but who have since initiated a request to join the meeting, are displayed.

9. The system of claim 8, wherein the predetermined period is output by a machine learned model trained by a machine learning algorithm.

10. The system of claim 9, wherein the machine learned model is trained by inputting training data including activity information from past meetings, the activity information indicating which users initiated a request to start a past meeting after a starting time of the past meeting, and how late the users initiated the request to start a past meeting, the machine learning algorithm identifying patterns in user behavior that indicate a likelihood of users in group joining a past meeting late, and by how much.

11. The system of claim 10, wherein the machine learning algorithm is a neural network.

12. The system of claim 10, wherein the machine learning algorithm is a logistic regression process.

13. The system of claim 10, further comprising retraining the machine learned model using new training data.

14. The system of claim 10, wherein the training data is transformed prior to the training.

15. A non-transitory machine-readable storage medium comprising instructions, which when implemented by one or more machines, cause the one or more machines to perform operations comprising:

receiving, at a meeting server, via a meeting server application program interface (API), meeting details from a calendar software client plugin, the meeting details regarding a meeting scheduled by a host using a calendar software client associated with the calendar software client plugin, the meeting details including a list of invitees and a starting time for the meeting;

at a time matching the starting time for the meeting, initiating a video conference for the one or more actual attendees, the one or more actual attendees being potential attendee who have initiated a request to join the meeting, the initiating the video conference including causing rendering of a first user interface screen on a client device of each of the one or more actual attendees, the first user interface screen comprising a first portion displaying a list of all potential attendees, including one or more potential attendees who have not initiated a request to join the meeting, and a second portion displaying content of the meeting; and after a predetermined period of time, altering the first portion so that only actual attendees, including any potential attendees who did not initiate a request to join the meeting by the starting time of the meeting but who have since initiated a request to join the meeting, are displayed.

16. The non-transitory machine-readable storage medium of claim 15, wherein the predetermined period is output by a machine learned model trained by a machine learning algorithm.

17. The non-transitory machine-readable storage medium of claim 16, wherein the machine learned model is trained by inputting training data including activity information from past meetings, the activity information indicating which users initiated a request to start a past meeting after a starting time of the past meeting, and how late the users initiated the request to start a past meeting, the machine learning algorithm identifying patterns in user behavior that indicate a likelihood of users in group joining a past meeting late, and by how much.

18. The non-transitory machine-readable storage medium of claim 17, wherein the machine learning algorithm is a neural network.

19. The non-transitory machine-readable storage medium of claim 17, wherein the machine learning algorithm is a logistic regression process.

20. The non-transitory machine-readable storage medium of claim 17, further comprising retraining the machine learned model using new training data.

\* \* \* \* \*